(12) United States Patent
Suzuki et al.

(10) Patent No.: US 11,001,449 B2
(45) Date of Patent: May 11, 2021

(54) CONVEYOR BELT

(71) Applicant: The Yokohama Rubber Co., LTD., Tokyo (JP)

(72) Inventors: Etsuko Suzuki, Hiratsuka (JP); Atsushi Miyajima, Hiratsuka (JP)

(73) Assignee: The Yokohama Rubber Co., LTD.

(*) Notice: Subject to any disclaimer, the term of this patent is extended or adjusted under 35 U.S.C. 154(b) by 0 days.

(21) Appl. No.: 15/741,750

(22) PCT Filed: Jun. 16, 2016

(86) PCT No.: PCT/JP2016/067886
§ 371 (c)(1),
(2) Date: Jan. 3, 2018

(87) PCT Pub. No.: WO2017/022338
PCT Pub. Date: Feb. 9, 2017

(65) Prior Publication Data
US 2018/0194559 A1    Jul. 12, 2018

(30) Foreign Application Priority Data
Jul. 31, 2015    (JP) .............................. JP2015-152058

(51) Int. Cl.
*B65G 15/34* (2006.01)
*B32B 5/02* (2006.01)

(52) U.S. Cl.
CPC .............. *B65G 15/34* (2013.01); *B32B 5/024* (2013.01); *B32B 2307/554* (2013.01); *B32B 2433/02* (2013.01); *B65G 2207/48* (2013.01); *B65G 2812/02198* (2013.01); *B65G 2812/02217* (2013.01)

(58) Field of Classification Search
CPC ................................ B65G 15/34; B65G 15/36
USPC .................................................. 198/846, 847
See application file for complete search history.

(56) References Cited

U.S. PATENT DOCUMENTS

| | | | | |
|---|---|---|---|---|
| 2,505,354 A | * | 4/1950 | Carroll | F16G 1/04 198/847 |
| 2,511,581 A | * | 6/1950 | Grigsby | B65G 15/36 198/847 |
| 3,944,060 A | * | 3/1976 | Hartmann | B65G 15/34 198/847 |
| 3,973,670 A | * | 8/1976 | Spaar | B65G 15/36 198/847 |
| 4,094,402 A | * | 6/1978 | Heeke | B65G 15/34 198/847 |

(Continued)

FOREIGN PATENT DOCUMENTS

| GB | 901707 | 7/1962 |
|---|---|---|
| GB | 2 152 000 | 7/1985 |

(Continued)

OTHER PUBLICATIONS

International Search Report for International Application No. PCT/JP2016/067886 dated Aug. 23, 2016, 4 pages, Japan.

*Primary Examiner* — William R Harp
(74) *Attorney, Agent, or Firm* — Thorpe North & Western

(57) ABSTRACT

A conveyor belt includes core layers made of fabric disposed between an upper cover rubber and a lower cover rubber. At least one core layer has a strength in the belt width direction ranging from 30% to 70% of a strength in the belt longitudinal direction.

5 Claims, 3 Drawing Sheets

(56) References Cited

U.S. PATENT DOCUMENTS

| | | | | |
|---|---|---|---|---|
| 4,407,333 | A * | 10/1983 | Fowkes | D03D 11/00 139/415 |
| 4,518,647 | A * | 5/1985 | Morrison | A01F 15/07 442/246 |
| 4,526,637 | A * | 7/1985 | Long | B29D 29/06 156/137 |
| 4,650,068 | A | 3/1987 | Vanassche et al. | |
| 4,957,199 | A * | 9/1990 | Wokke | B65G 15/36 198/844.1 |
| 7,484,618 | B2 * | 2/2009 | Foust | B65G 15/34 198/844.1 |
| 7,759,266 | B2 * | 7/2010 | Hawkins | B32B 25/10 156/148 |
| 8,240,463 | B2 * | 8/2012 | Graber | B65G 15/40 198/847 |
| 10,815,061 | B1 * | 10/2020 | Moon | B65G 15/36 |
| 2008/0078657 | A1 * | 4/2008 | Hawkins | B65G 15/30 198/846 |
| 2008/0164127 | A1 * | 7/2008 | Hawkins | B65G 15/32 198/844.1 |
| 2011/0303101 | A1 | 12/2011 | Fan et al. | |
| 2012/0168285 | A1 * | 7/2012 | Holland | B65G 15/34 198/847 |
| 2015/0079260 | A1 | 3/2015 | Fan et al. | |

FOREIGN PATENT DOCUMENTS

| | | |
|---|---|---|
| JP | S59-031144 | 2/1984 |
| JP | 2004-149267 | 5/2004 |
| JP | 2008-169022 | 7/2008 |
| JP | 2009-274797 | 11/2009 |
| WO | WO 2011/156760 | 12/2011 |
| WO | WO 2015/111486 | 7/2015 |

* cited by examiner

CONVEYOR BELT

TECHNICAL FIELD

The present technology relates to a conveyor belt and particularly relates to a conveyor belt that can provide a long service life by suppressing longitudinal tearing in the conveyor belt caused by objects to be conveyed being fed on to an upper cover rubber.

BACKGROUND ART

In a conveyor belt, a core layer is embedded between an upper cover rubber and a lower cover rubber to bear the tension when the conveyor belt is mounted in a tensioned stated. A conveyor belt with a damaged core layer cannot be properly mounted. Thus, preventing damage to the core layer is vital to ensure the operation of a conveyor belt.

The fabric used as the core layer is made of a plain weave of warp threads and weft threads, for example. Typically, the warp threads that extend in a belt longitudinal direction and the weft threads that extend in a belt width direction are different from one another (see Japanese Unexamined Patent Application Publication No. 2004-149267, paragraph [0023]). In other words, the core layer is mainly designed to bear the tension that acts on the conveyor belt, and thus strength of the core layer in the belt longitudinal direction is accordingly high. However, the strength of the core layer in the belt width direction is too low to prevent disarray of the fabric (warp threads). For example, the strength of the core layer in the belt width direction is approximately 15% of the strength in the belt longitudinal direction.

Thus, when objects to be conveyed are fed on to the upper cover rubber for a significant height or when the weight of the objects to be conveyed is large, the weft threads of the core layer may be damaged by the impact from the objects to be conveyed, causing tearing (longitudinal tears) in the conveyor belt (core layer). Such longitudinal tears lead to critical damage to the core layer which shortens the service life of the conveyor belt. Particularly, when the objects to be conveyed are fed from a significant height or when the weight of the objects to be conveyed is large, the likelihood of premature damage to the weft threads is increased. This further works against ensuring the long service life of the conveyor belt.

SUMMARY

The present technology provides a conveyor belt that can provide a long service life by suppressing longitudinal tearing in the conveyor belt caused by objects to be conveyed being fed on to an upper cover rubber.

A conveyor belt according to an embodiment of the present technology comprises:

at least one core layer made of fabric;

an upper cover rubber and a lower cover rubber located vertically on either side of the core layer;

at least one core layer of the at least one core layer having a strength in a belt width direction ranging from 30% to 70% of a strength in a belt longitudinal direction.

A conveyor belt according to an embodiment of the present technology has at least one core layer having a strength in the belt width direction ranging from 30% to 70% of a strength in the belt longitudinal direction, making the strength in the belt width direction significantly greater than that in the related art. This is beneficial in preventing longitudinal tearing in the core layer caused by the impact of the fed objects to be conveyed. Accordingly, the core layer can be protected for an extended period of time, thus lengthening the service life of the conveyor belt.

Preferably, at least one core layer comprises an outermost core layer and an innermost core layer, and at least the outermost core layer and the innermost core layer have a strength in the belt width direction ranging from 30% to 70% of a strength in the belt longitudinal direction. When sharp objects to be conveyed are fed on to the upper cover rubber, the core layer most proximal to the surface of the upper cover rubber is most susceptible to damage. Additionally, when dull objects to be conveyed are fed, the strain caused by the impact is greatest at the core layer most proximal to the lower cover rubber. Thus, accordingly to this configuration, longitudinal tearing can be suppressed in the core layer disposed at a position under relatively harsh conditions. As a result, the core layer can be efficiently reinforced and the service life of the conveyor belt can be lengthened.

Preferably, at least one core layer comprises a plurality of core layers, all of which have a strength in the belt width direction ranging from 30% to 70% of a strength in the belt longitudinal direction. In such an embodiment, all of the core layers are resistant to damage, so longitudinal tearing in the core layer is more easily prevented.

Preferably, the core layer having a strength in the belt width direction ranging from 30% to 70% of a strength in the belt longitudinal direction is disposed only in a central portion in the belt width direction. The objects to be conveyed are fed and placed mainly in the central portion in the belt width direction. Thus, in this configuration, the core layer in the central portion in the belt width direction under relatively harsh conditions is resistant to longitudinal tearing. As a result, the core layer can be efficiently reinforced and the service life of the conveyor belt can be lengthened.

DETAILED DESCRIPTION

Figure 1:
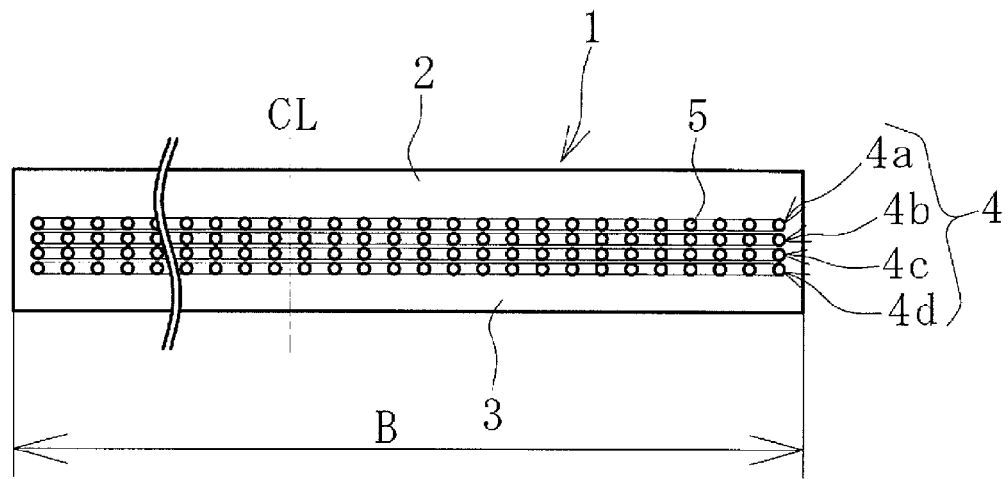
FIG. 1 is a cross-sectional view illustrating a conveyor belt according to an embodiment of the present technology.

A conveyor belt according to embodiments of the present technology will be described below with reference to the drawings. Note that the dot-dash line CL in the drawings represents the center of the conveyor belt in the belt width direction.

Figure 2:
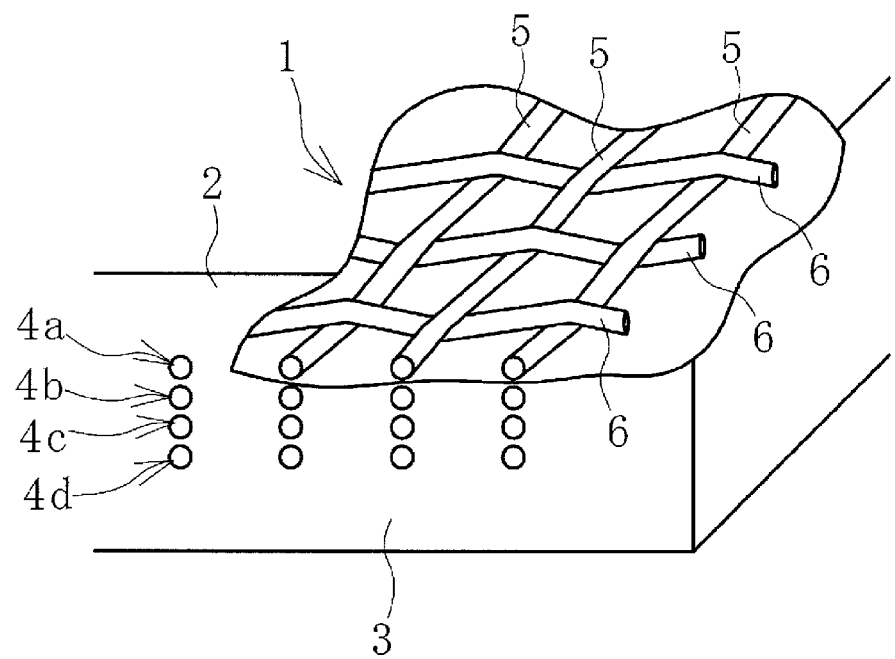
FIG. 2 is perspective view schematically illustrating the internal structure of the conveyor belt of FIG. 1 with a portion removed.
Figure 3:
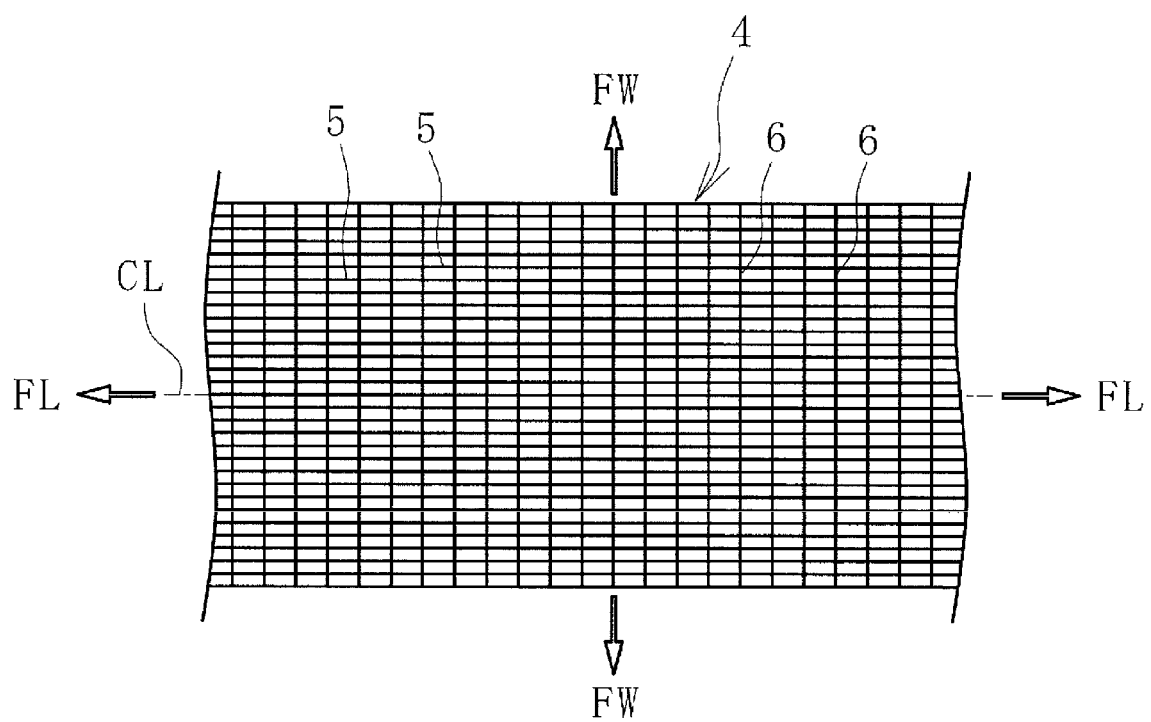
FIG. 3 is an explanatory drawing illustrating the core layer of FIG. 1 in a plan view.

As illustrated in FIGS. 1 to 3, a conveyor belt 1 is provided with a core layer 4, and an upper cover rubber 2 and a lower cover rubber 3 disposed above and below the core layer 4. These components are integrally formed with one another via vulcanization. The conveyor belt 1 may also include edge rubber disposed on each end portion in the belt width direction or other constituents as appropriate.

The core layer 4 is made of a fabric. Specifically, the core layer 4 has a configuration in which coating rubber covers the surface of a plain weave made of warp threads 5 and weft threads 6. The coating rubber is bonded via vulcanization bonding to the upper cover rubber 2 and the lower cover rubber 3, and the coating rubber is bonded to the warp threads 5 and the weft threads 6.

As the upper cover rubber 2 and the lower cover rubber 3, a rubber composition is used that contains a diene rubber including at least natural rubber and carbon black or the like to provide good wear resistance. The layer thickness of the upper cover rubber 2 and the lower cover rubber 3 is appropriately set depending on the desired performance of the conveyor belt 1. The coating rubber is a rubber with excellent adhesiveness.

The core layer 4 can be a single layer or multilayer of 4 to 8 layers, for example. In this embodiment, four core layers 4a, 4b, 4c, 4d are layered on top of one another. Examples of the fiber used in the warp threads 5 include polyester fiber, nylon fiber, aramid fiber, vinylon fiber, PBO (polyparaphenylene benzobisoxazole) fiber, hard polyarylate fiber, and the like. Examples of the fiber used in the weft threads 6 include polyester fiber, nylon fiber, aramid fiber, vinylon fiber, PBO fiber, hard polyarylate fiber, and the like. The material of the warp threads 5 and the weft threads 6 may be the same or different.

The warp threads 5 and the weft threads 6 have an outer diameter ranging from 0.3 mm to 1.5 mm, for example. The total thickness of the core layer 4 ranges from 1.0 mm to 3.0 mm, for example.

Figure 4:
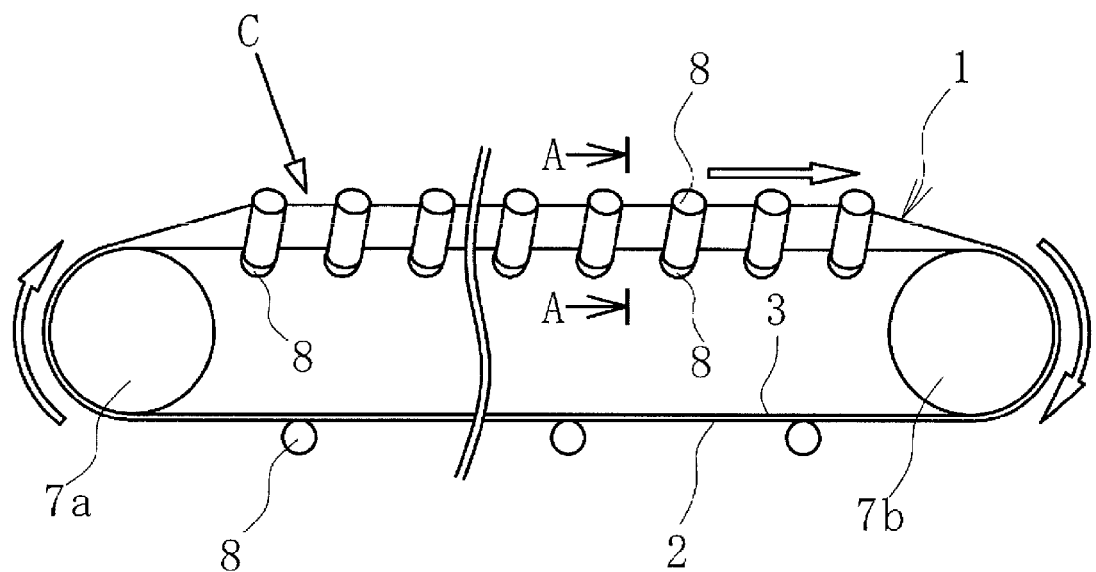
FIG. 4 is an explanatory drawing illustrating a conveyor belt according to an embodiment of the present technology mounted in a tensioned state between pulleys as viewed from the side.
Figure 5:
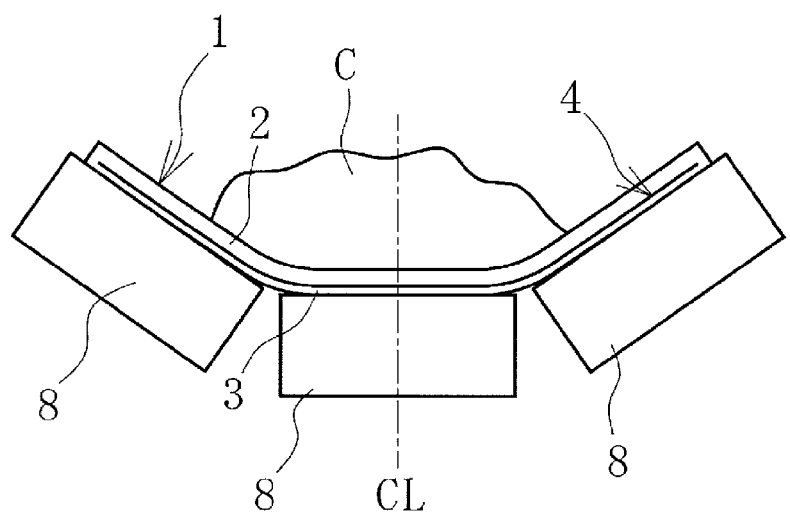
FIG. 5 is a cross-sectional view taken along A-A of FIG. 4.
Figure 6:
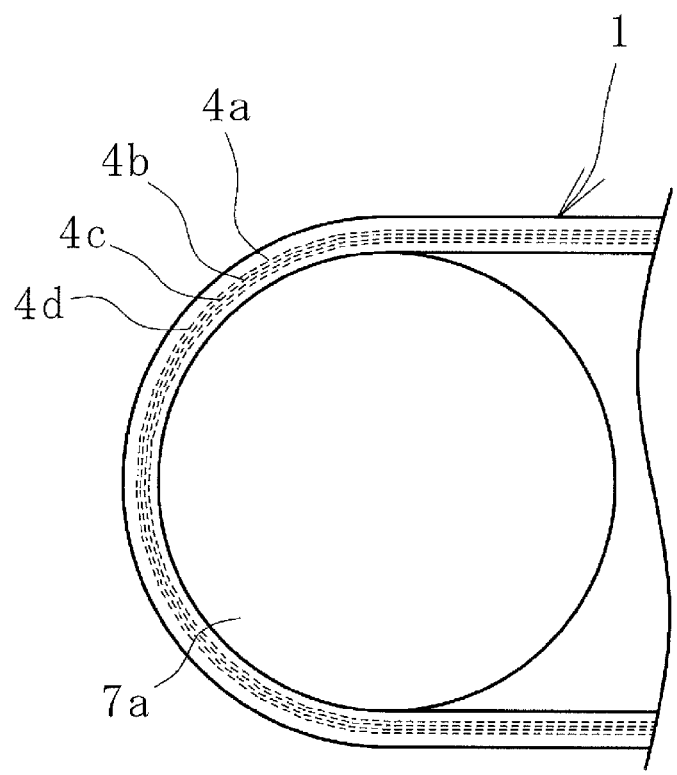
FIG. 6 is an explanatory drawing illustrating the internal structure of the conveyor belt of FIG. 4 as viewed from the side.

As illustrated in FIGS. 4 and 5, the conveyor belt 1 is mounted in a tensioned state between pulleys 7a, 7b. The conveyor belt 1 on the carrying side is supported in a trough shape projecting downward by support rollers 8. The fed objects to be conveyed C are mainly placed in the central portion of the upper cover rubber 2 in the belt width direction.

A predetermined setting tension Ts in the belt longitudinal direction acts on the conveyor belt 1 mounted on the pulleys 7a, 7b. The tension that acts on the conveyor belt 1 is essentially borne by the core layer 4, thus the predetermined setting tension Ts in the belt longitudinal direction constantly acts on the core layer 4. The value of the setting tension Ts depends on the specifications of the conveyor belt 1 and is set to a value appropriate to enable normal operation of the conveyor belt 1. Thus, a strength FL of the core layer 4 in the belt longitudinal direction is set to a sufficient strength to bear the setting tension Ts, i.e., FL>>Ts.

In an embodiment of the present technology, one of the core layers 4 has special specifications. The core layer 4 with special specifications has a strength FW in the belt width direction ranging from 30% to 70% of the strength FL in the belt longitudinal direction. In other words, in an embodiment of the present technology, the ratio (FW/FL) of the strength FW in the belt width direction to the strength FL in the belt longitudinal direction of the core layer 4 is greatly increased over that in the related art.

Specifically, the warp threads 5 have a relatively high tensile strength (strength in the belt longitudinal direction), and thus the core layer 4 has relatively high tensile strength (strength FL in the belt longitudinal direction). For example, the strength in the belt longitudinal direction of the core layer 4 per unit width ranges from 250 N/mm to 500 N/mm per core layer 4 (core layers 4a, 4b, 4c, 4d) (the strength at break when a sample 50 mm in width cut from the core layer 4 in the belt width direction (extension direction of the weft threads 6) is pulled in the extension direction of the warp threads 5 (measured in accordance with JIS (Japanese Industrial Standard) K6322)). The tensile strength of the weft threads 6 is less than that of the warp threads 5 but higher than that in the related art. Thus, the core layer 4 has a tensile strength (strength FW in the belt width direction) higher than that in the related art. For example, the strength in the belt width direction of the core layer 4 per unit width ranges from 125 N/mm to 250 N/mm per core layer 4 (core layers 4a, 4b, 4c, 4d) (the strength at break when a sample 50 mm in width cut from the core layer 4 in the belt longitudinal direction (extension direction of the warp threads 5) is pulled in the extension direction of the weft threads 6 (measured in accordance with JIS K6322)). The core layer 4 according to an embodiment of the present technology has a strength FW in the belt width direction ranging from 30% to 70% of the strength FL in the belt longitudinal direction.

The upper cover rubber 2 receives the impact from the fed objects to be conveyed C. When the objects to be conveyed C are fed, the core layer 4 is pressed by the objects to be conveyed C and tensile force acts upon the core layer 4. In other words, an additional tensile force acts upon the warp threads 5 and the weft threads 6. Thus, when the tensile strength of the weft threads 6 is relatively excessively low, the weft threads 6 are damaged and break. As a result, longitudinal tears form in the core layer 4 (conveyor belt 1).

In relation to the damage to the conveyor belt 1 from the objects to be conveyed C, the present technology provides a special core layer 4 with a strength FW in the belt width direction not known in the related art. In other words, the core layer 4 has the strength FW in the belt width direction, which ranges from 30% to 70% of the strength FL in the belt longitudinal direction, making the weft threads 6 of the core layer 4 resistant to damage and breakage. Thus, longitudinal tearing can be suppressed. This is beneficial in lengthening the service life of the conveyor belt 1.

When core layer 4 has a strength FW in the belt width direction that is less than 30% of the strength FL in the belt longitudinal direction, longitudinal tearing cannot be sufficiently prevented. When the core layer 4 has a strength FW in the belt width direction greater than 70% of the strength FL in the belt longitudinal direction, the bending rigidity of the conveyor belt 1 in the belt width direction is excessive and the trough-likeness is reduced (becomes difficult to form the trough shape).

According to the analysis of the present inventors, when the objects to be conveyed C with a relatively non-sharp (dull) impact surface are fed on to the upper cover rubber 2, the innermost core layer 4d of the multilayered core layers 4a to 4d experiences the most strain. In other words, the innermost core layer 4d is in the condition to be most easily damaged by the impact from the dull objects to be conveyed C. The special specifications described above are preferably applied to the innermost core layer 4d. This allows damage to the weft threads 6 of the core layer 4d due to the impact of the fed objects to be conveyed C to be avoided and is beneficial in preventing longitudinal tearing.

Additionally, when sharp objects to be conveyed C are fed on to the upper cover rubber 2, the core layer 4a most proximal to the surface of the upper cover rubber 2 is most susceptible to damage. In other words, the outermost core layer 4a is in the condition to be most easily damaged by sharp objects to be conveyed C. Thus, the special specifications described above are also preferably applied to the outermost core layer 4a. This allows damage to the weft threads 6 of the core layer 4a due to the impact of the fed objects to be conveyed C to be avoided and is beneficial in preventing longitudinal tearing.

In other words, at least the outermost core layer 4a and the innermost core layer 4d preferably have the special specifications described above. By only the outermost core layer 4a and the innermost core layer 4d having the special specifications described above, the core layers 4a, 4d disposed at locations under relatively harsh conditions can be efficiently reinforced and the service life of the conveyor belt 1 can be lengthened.

For the conveyor belt 1 that conveys sharp objects to be conveyed C, only the outermost core layer 4a can be provided with the special specifications described above. For the conveyor belt 1 that conveys non-sharp objects to be conveyed C, only the innermost core layer 4d can be provided with the special specifications described above.

All of the core layers 4a to 4d can also be provided with the special specifications described above. In such an embodiment, the weft threads 6 of the core layers 4a to 4d are resistant to damage and breakage and longitudinal tearing is more easily prevented.

For a conveyor belt 1 on which the objects to be conveyed C are mainly fed in the central portion of the upper cover rubber 2 in the belt width direction, the core layer 4 with the special specifications described above can be disposed only in the central portion in the belt width direction. "Central portion in the belt width direction" refers to an area in the central portion in the belt width direction having from approximately 50% to 80% of the belt width B. In such an embodiment, the central portion of the core layer 4 under relatively harsh conditions can be efficiently reinforced and the service life of the conveyor belt 1 can be lengthened.

The core layer 4 has a strength FW in the belt width direction ranging from 30% to 70% of the strength FL in the belt longitudinal direction. This ensures that the bending rigidity of the core layer 4 in the longitudinal direction does not increase. Thus, there is no increase in the energy required for operating the conveyor belt 1 according to an embodiment of the present technology.

Examples

Two types of conveyor belt test samples (example, conventional example) were manufactured with four core layers made of plain weave fabric, with the only difference between the two types being they had different values for the ratio (FW/FL) of the strength FW in the belt width direction to the strength FL in the belt longitudinal direction, as indicated in Table 1. A first layer was disposed most proximal to the upper cover rubber, and a second, third, and fourth layer were layered in this order under the first layer. Each of the test samples were placed on a base. A weight was dropped on the upper cover rubber and the amount of damage thereafter was checked. The results are shown in Table 1. The weight had a mass of 60 kg, and a lower end portion (portion that comes into contact with the upper cover rubber) with a spherical surface having a radius of 20 mm.

TABLE 1

|  |  | Conventional example | Example |
|---|---|---|---|
| Upper cover rubber Thickness (mm) |  | 16 | 16 |
| Lower cover rubber Thickness (mm) |  | 6 | 6 |
| FW/FL of core layer (%) | First layer | 15 | 53 |
|  | Second layer | 15 | 53 |
|  | Third layer | 15 | 53 |
|  | Fourth layer | 15 | 53 |
| Amount of damage |  | First to fourth layers Weft thread breakage No warp thread breakage | First to fourth layers No weft thread breakage No warp thread breakage |

As can be seen from the results of Table 1, compared to the conventional example, the example more effectively prevented damage to the core layer and suppressed longitudinal tearing in the conveyor belt.

The invention claimed is:

1. A conveyor belt, comprising:
a core layer, having 4 to 8 layers, made of fabric, the core layer having a plain weave structure; and
an upper cover rubber and a lower cover rubber located vertically on either side of the core layer;
at least one layer of the core layer having a strength in a belt width direction ranging from 30% to 70% of a strength in a belt longitudinal direction; wherein:
the conveyor belt is configured to convey objects to be conveyed while being supported in a trough shape projecting downward;
the core layer has a strength in the belt width direction ranging from 30% to 70% of a strength in the belt longitudinal direction and is disposed only in a central portion in the belt width direction; and
the central portion is an area from 50% to 80% of the conveyor belt width in the belt width direction.

2. The conveyor belt according to claim 1, wherein the layers of the core layer comprise an outermost layer and an innermost layer, and at least the outermost layer and the innermost layer have a strength in the belt width direction ranging from 30% to 70% of a strength in the belt longitudinal direction.

3. The conveyor belt according to claim 1, wherein all of the layers of the core layer have a strength in the belt width direction ranging from 30% to 70% of a strength in the belt longitudinal direction.

4. The conveyor belt according to claim 1, wherein the layers of the core layer have the plain weave structure, wefts of the fabric of the layers being aligned across the layers.

5. The conveyor belt according to claim 1, wherein a coating rubber covers a surface of the core layer, and the upper cover rubber and the lower cover rubber are bonded to warp threads and weft threads which configure the core layer via the coating rubber.

* * * * *